US008433641B2

(12) United States Patent
Angle et al.

(10) Patent No.: US 8,433,641 B2
(45) Date of Patent: *Apr. 30, 2013

(54) FINANCIAL DATA PROCESSING SYSTEM AND METHOD

(75) Inventors: Corby Drake Angle, Cortlandt Manor, NY (US); Douglas Guy Kittelsen, Evergreen, CO (US); Malcolm Gary LaFever, Lyons, CO (US); Ted Nathan Myerson, Boynton Beach, FL (US); Anandan Murali Prasad, Chennai (IN)

(73) Assignee: Ften, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/064,877

(22) Filed: Apr. 22, 2011

(65) Prior Publication Data

US 2011/0202447 A1   Aug. 18, 2011

Related U.S. Application Data

(63) Continuation of application No. 12/836,943, filed on Jul. 15, 2010, now Pat. No. 8,010,443, and a continuation of application No. 10/954,527, filed on Sep. 30, 2004, now Pat. No. 7,778, 915.

(60) Provisional application No. 60/581,931, filed on Jun. 22, 2004, provisional application No. 60/536,559, filed on Jan. 15, 2004, provisional application No. 60/510,766, filed on Oct. 14, 2003.

(51) Int. Cl.
    *G06Q 40/00* (2006.01)
(52) U.S. Cl.
    USPC .............................................. 705/37; 705/35

(58) Field of Classification Search .............. 705/35–37, 705/38
See application file for complete search history.

(56) References Cited

U.S. PATENT DOCUMENTS

| 5,893,091 | A | 4/1999 | Hunt et al. |
|---|---|---|---|
| 6,763,384 | B1 | 7/2004 | Gupta et al. |
| 7,584,141 | B1 | 9/2009 | Andrews |
| 7,778,915 | B2 | 8/2010 | Angle et al. |
| 2002/0087454 | A1 | 7/2002 | Calo et al. |
| 2002/0184237 | A1 * | 12/2002 | McFeely .................... 707/104.1 |
| 2003/0009419 | A1 * | 1/2003 | Chavez et al. .................. 705/38 |
| 2003/0041006 | A1 | 2/2003 | Bunda |
| 2003/0097327 | A1 | 5/2003 | Anaya et al. |

(Continued)

OTHER PUBLICATIONS

U.S. Appl. No. 13/018,014, filed Jan. 31, 2011; Inventor: Kittelsen et al.

(Continued)

*Primary Examiner* — Lindsay M Maguire
*Assistant Examiner* — Hao Fu
(74) *Attorney, Agent, or Firm* — Nixon & Vanderhye P.C.

(57) ABSTRACT

To process financial articles of trade, real time data is collected from a plurality of liquidity destinations in trading at least one of securities, commodities, options, futures and derivatives, the real time data including information on submitted transactions of financial articles of trade. The real time data collected from the plurality of liquidity destinations is aggregated. The real time data is streamed in a standardized form. User criteria are established to identify relevant portions of the streamed real time data. The streamed real time data is analyzed according to the user criteria. The analyzed real time data is consolidated into a computer data base.

15 Claims, 4 Drawing Sheets

U.S. PATENT DOCUMENTS

| | | | |
|---|---|---|---|
| 2003/0139990 A1* | 7/2003 | Greco | 705/35 |
| 2004/0059666 A1 | 3/2004 | Waelbroeck et al. | |
| 2004/0260553 A1 | 12/2004 | Niemi | |
| 2005/0044035 A1 | 2/2005 | Scott | |
| 2005/0154668 A1 | 7/2005 | Burns et al. | |
| 2005/0203825 A1 | 9/2005 | Angele et al. | |
| 2005/0251448 A1 | 11/2005 | Gropper | |
| 2007/0156919 A1 | 7/2007 | Potti et al. | |
| 2008/0086401 A1 | 4/2008 | Mather | |
| 2008/0243675 A1 | 10/2008 | Parsons et al. | |
| 2008/0281750 A1 | 11/2008 | Toffey et al. | |
| 2009/0234776 A1 | 9/2009 | Bauerschmidt et al. | |

OTHER PUBLICATIONS

U.S. Appl. No. 12/836,943, filed Jul. 15, 2010; Inventor: Angle et al.

U.S. Appl. No. 12/914,699, filed Oct. 28, 2010; Inventor: Cole et al.

U.S. Appl. No. 12/873,148, filed Aug. 31, 2010; Inventor: Cole et al.

U.S. Appl. No. 12/131,921, filed Jun. 2, 2008; Inventor: Kittelsen et al.

Notification of Transmittal of International Searich Report and Written Opinion for International Application No. PCT/US10/54538 mailed Jan. 4, 2011.

Notification of Transmittal of International Preliminary Report and Written Opinion for International Application No. PCT/US10/47394 mailed Oct. 22, 2010.

Office Action mailed Sep. 9, 2010 in co-pending U.S. Appl. No. 12/836,943.

Office Action mailed Jul. 28, 2010 in co-pending U.S. Appl. No. 12/131,921.

Office Action mailed Nov. 9, 2010 in co-pending U.S. Appl. No. 12/131,921.

International Search Report for PCT/US08/07025, mailed Aug. 20, 2008.

Written Opinion of the International Searching Authority for PCT/US08/07025, mailed Aug. 20, 2008.

\* cited by examiner

FINANCIAL DATA PROCESSING SYSTEM AND METHOD

CROSS REFERENCE TO RELATED APPLICATION

This application is a continuation of U.S. application Ser. No. 12/836,943, filed on Jul. 15, 2010, now U.S. Pat. No. 8,010,443, (incorporated herein by reference), which claims priority to and the benefit of U.S. Provisional Patent Application No. 60/510,766, entitled "RiskXposure™ Capabilities in MultiXchange™ Securities Trading Platform," filed on Oct. 14, 2003, which is herein incorporated by reference in its entirety; claims priority to and the benefit of U.S. Provisional Patent Application No. 60/536,559, entitled "Network Montage™," filed on Jan. 15, 2004, which is herein incorporated by reference in its entirety; claims priority to and the benefit of U.S. Provisional Patent Application No. 60/581,931, entitled "Intraday Insight," filed on Jun. 22, 2004, which is herein incorporated by reference in its entirety; and is a continuation of and claims priority to and the benefit of U.S. patent application Ser. No. 10/954,527, now U.S. Pat. No. 7,778,915, entitled "Financial Data Processing System," filed on Sep. 30, 2004, which claims priority to and the benefit of all the above listed provisional patent applications, and which is herein incorporated by reference in its entirety.

TECHNOLOGY OVERVIEW

The technology relates to a system for consolidating and analyzing intraday issues related to securities transactions that have been submitted to liquidity destinations, and more specifically to a system for consolidating and analyzing intraday issues involving at least one of disparate systems, multiple parties and multiple liquidity destinations.

BACKGROUND

Various systems exist which assist in the formulation and submission of securities trading transactions to liquidity destinations, otherwise known as Pre-Trade Systems, collect and process information related to consummated transactions after the close of the securities market each day, otherwise known as Post Market Systems, and enable risk and portfolio risk modeling and analysis after the close of the securities market each day, otherwise known as Post Market Analysis Systems. An overview of the trading market is illustrated in FIG. 4. In addition, systems exist that support intraday risk analysis and modeling but only for those transactions processed through, or integrated with, such systems, otherwise known as Intraday Closed Systems.

The popularity of disparate trading systems, Delivery versus Payment (DVP) or Receipt versus Payment (RVP) transactions and multiple prime brokerage relationships creates a situation where intraday risk exposure from large volume, large dollar U.S. equity transactions is not properly managed by existing Pre-Trade Systems, Intraday Closed Systems, Post Market Systems or Post Market Analysis Systems. These systems fail to address the significant losses that can result from delayed response to intraday risk exposure.

The effectiveness of pre-trade risk management in existing trading systems has been severely limited by the growing use of multiple trading systems by institutional investors to access common pools of capital to affect sophisticated investment strategies. These disparate systems have been limited to managing risks associated with internal transaction flow. Therefore, a consolidated view of risk could only be possible at day's end, after close of the market and then only on a retrospective basis when information from disparate systems could be collected and analyzed.

Institutional clients often use brokers to execute transactions involving United States equities that are physically held and cleared by another broker or custodial bank, via Delivery versus Payment (DVP) or Receipt versus Payment (RVP) transactions. Risk management systems used by executing brokers are generally unable to manage risks associated with these transactions, because they are not integrated with the risk management systems of other potentially involved executing brokers and/or with one or more risk management systems of one or more relevant custodians. As a result, risks associated with such transactions may only be evident after close of the trading day.

Hedge funds and other institutional investors increasingly participate in "away" trades. This means that the trade was done by an executing broker other than the client's clearing firm or prime broker on an agency basis (e.g. securities were bought and sold directly into or out of the clients account) or on a riskless principle basis (the executing broker executes the trade after receiving an order from the investor and then allocates the trade to the investor's account with a markup/markdown or commission). In both situations, the trade is done using an identifier (generally known in the industry as a "Neumonic" or "MPID") that is different than the investor's identifier but is subsequently allocated to that investor through the Depository Trust Company (DTC) for clearing at the investor's clearing firm. In addition, hedge funds and other institutional investors enter into multiple clearing arrangements with clearing firms or prime brokers. In this situation, the investor may have funds on deposit at each firm and each firm, actually clears his transactions, or he may have a DVP/RVP relationship with one or more of the firms where the trades are transferred (generally referred to in the industry as "given up") to the firm that will actually do the clearing of the transaction. In all of the above situations, risks associated with transactions may only be evident after close of the trading day.

SUMMARY

In one non-limiting example embodiment, a method of processing financial articles of trade is provided. The method includes collecting real time data from a plurality of liquidity destinations in trading at least one of securities, commodities, options, futures and derivatives, the real time data including information on transactions of financial articles of trade after they have been submitted to the liquidity destinations. The real time data collected from the plurality of liquidity destinations is aggregated. The real time data is converted and streamed in a standardized form. User criteria are established to identify relevant portions of the streamed real time data. The user criteria are consolidated into a computer data base. The standardized real time data is then compared against the user criteria to determine what if any user defined criteria is impacted by the real time data.

In another non-limiting example embodiment, a financial article of trade data processing system is provided. The system includes a data communication element arranged to connect to and collect real time data from a plurality of liquidity destinations for trading at least one of securities, commodities, options, futures and derivatives. The real time data includes information on completed transactions of financial articles of trade. A computer communicates with the data communication element and is programmed to aggregate the real time data collected from the plurality of liquidity destinations and stream the real time data in a standardized form. A user parameter element is established for comparison to the real time data. The computer is programmed to compare the real time data against the user criteria to determine if any user defined criteria is impacted by the real time data.

These and other features will become more fully apparent from the following description and appended claims.

BRIEF DESCRIPTION OF THE DRAWINGS

To further clarify the above and other advantages and features, a more particular description will be rendered by reference to non-limiting example embodiments, some of which are illustrated in the appended drawings. It is appreciated that these drawings depict only example embodiments and are therefore not to be considered limiting.

DESCRIPTION OF NON-LIMITING EXAMPLE EMBODIMENTS

The subject of this application is a financial article of trade data processing system 10 including various functions, which may be implemented to perform consolidation and analysis of intraday issues related to submitted securities, commodities, options, futures transactions, where securities, commodities, options, and futures are examples of financial articles of trade. The system 10 adapts the submitted securities, commodities, options, futures, or other financial articles of trade transaction to involve at least one of disparate systems, multiple parties and multiple liquidity destinations. Reference to securities or security transactions within this disclosure should be interpreted as transactions involving securities, commodities, option or futures. The term "other financial articles of trade" transaction refers to any other article traded at the liquidity destinations other than securities, commodities, options, and futures. It should be appreciated that different configurations can be used to consolidate and analyze the data to achieve a given result. Although particular combinations are disclosed, variations on those combinations can be used to achieve the same consolidation and analysis in the financial article of trade data processing system 10.

The technology described in this application enables users to take action promptly on an intraday basis to mitigate the impact of changes in intraday market conditions that can otherwise exacerbate losses and also enables real-time intraday comparison of trading statistics. This long felt, unmet need in the securities industry has existed since the mid-1990's since Alternate Trading Systems were authorized and the number of direct access trading platforms proliferated; however, until now, no solution existed to address this pressing industry need.

Figure 1:
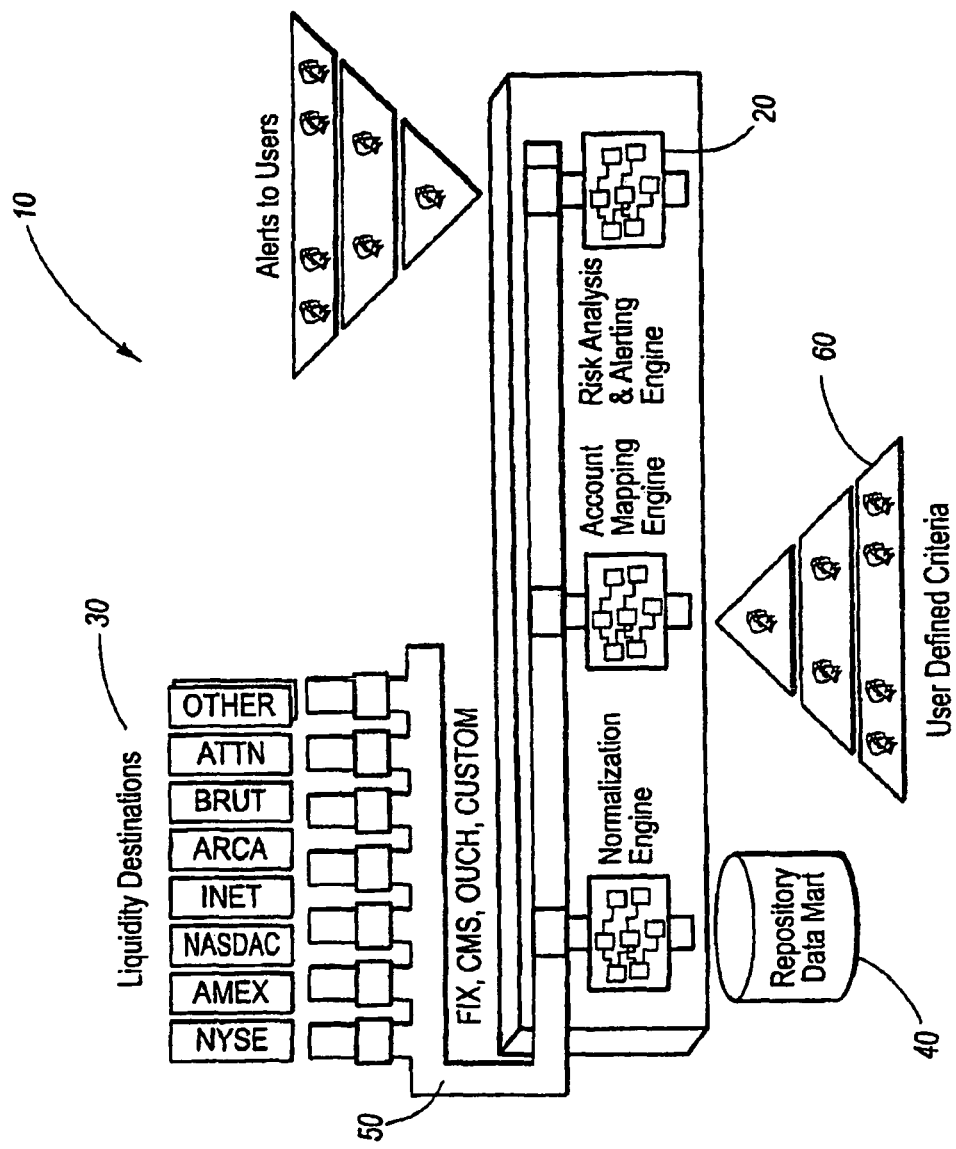
FIG. 1 is a schematic representation of a system in accordance with a non-limiting example embodiment.

As illustrated in FIG. 1, the system 10 enables parties involved in the purchase and/or sale of securities, commodities and other financial articles to monitor intraday issues related to submitted securities transactions regardless of which securities trading system(s) were used by such party or such party's clients to affect such transactions, regardless of which liquidity destination or destinations was/were used to effect such transactions (e.g., the NYSE, NASDAQ or Alternative Trading Systems such as ECNs), and regardless of which third parties ultimately became involved in effecting such transactions (e.g., the initiating client, intermediary broker dealer(s), clearing firms, etc.). A computer 20 consolidates and collects transaction information directly from each liquidity destination 30 as transactions are submitted over the course of the day at such destinations 30. By collecting information directly from the liquidity destinations 30 as the transactions are submitted, there is no need to integrate with any of the systems used to affect transactions with the liquidity destinations 30. In accordance with various embodiments, the components described in the system 10 can be integrated into a single unit, connected to a network or distributed across various networks and/or devices.

An aggregation component 22 collects and aggregates information or data 50 from the liquidity destinations 30 following submission of the data to the liquidity destinations. Collecting data 50 directly from liquidity destinations 30 following submission of transactions, as opposed to relying on data provided directly by clients and/or by clients' systems, ensures the integrity and objectivity of such data 50. This data collection improves compliance with regulatory requirements that require oversight of clients' securities trading activities. In addition, collecting data 50 directly from liquidity destinations 30 following submission of transactions avoids (i) delays in processing the transactions, (ii) gaps in coverage caused by the use of more than one system to affect the transactions with liquidity destinations, (iii) gaps in coverage caused by the use of more than one liquidity destination, and (iv) gaps in coverage caused by the involvement of multiple parties with regard to different aspects of the transactions.

At the same time, transaction specific data is collected from the liquidity destinations 30, relevant market information can also be collected from other sources. For example, the cost if the transaction had been consummated at a different liquidity destination at the same time, the average cost of the transaction at the time in question across all liquidity destinations, etc. The relevant market information can provide a "snapshot" of relevant intraday market conditions so as to enable clients to assess the efficiency of their transactions and make adjustments in real-time during the course of the day.

Similarly, as transaction specific data is collected from liquidity destinations 30, other user criteria 60, such as parameters of relevant account information is collected in a data base 40 so as to enable a real-time comparison of intraday activity versus historical activity. The computer 20 can convert the data 50 collected directly from the disparate liquidity destinations 30 into a common, normalized format and store the normalized transaction information in the data base 40.

For example, the system 10 collects and aggregates information from numerous networks involved in or related to a user criteria 60, such as a transaction. The information collected from internal networks and external third party managed networks provides a more realistic perspective on the overall activity related to the specified situation.

Various aggregation tools can be used to interact with different network technologies and topologies to aggregate desired information with the aggregation component 22. In some cases, this tool must be able to learn the particular private messaging infrastructure to monitor and record appropriate activity. In other cases, the system 10 will need to know how to interact with other systems to make requests on a timed or event driven basis. This interaction could involve message-based inquiries, direct access to databases or other transaction-based requests. When relevant information related to a given situation, such as a transaction, is found on one or more monitored networks, the aggregation component 22 collects the relevant information and, if necessary, packages, or translates it into an appropriate normalized format and submits it to the analysis component 24. For example, in connection with the example discussed herein for the securities industry, the widely known FIX standard could be used to package or translate the relevant information.

Data 50 is collected by the aggregation component 22 via interaction with relevant networks within the defined timeframes for such networks and with the permission of the managers or controllers of such networks. This data 50 may come from disparate networks in real-time, near real time and/or in batch mode. For example, in real time, the information could be collected from disparate networks via "drop copies." In near real time, the data 50 is collected within some short period of time. A batch mode can be set to an increment of time based on each network's business processes. The collected data 50 can include information from networks that reflect summarized and/or real-time data that relates to, but may not be directly impacted by, the particular situation or transaction being tracked. For example, in connection with the example discussed herein for the securities industry, securities market prices may be relevant to assessing the impact of a particular situation or transaction although the particular situation or transaction may not, in and of itself, impact securities market prices.

The data base 40 can also store user criteria 60, such as client specified information or monitoring requests, which have been "mapped" into a specified format. The format can translate unique client information or requirements, into a common structure to facilitate monitoring of incoming normalized transaction information on behalf of multiple clients at the same time without losing the unique client information or requirements of each client. Access controls are used to ensure that only authorized users are allowed to see transaction data.

The computer 20 compares the user criteria 60 against normalized information as such information is received from liquidity destinations 30. If and when matches occur in the information, the computer 20 can inform clients promptly during the day or intraday. The clients can be informed by way of one or more client initiated viewing sessions accessible via the Internet or via proactive alerts sent to clients by methods such as e-mail, on screen pop-up messages, instant messages, or other sensory alerts.

The analysis component 24 processes inbound information from the aggregation component 22 and compares it against user criteria 60, such as parameters or rules that are identified by users with regard to certain risks, trends, outages, uses, or other desired limits. The analysis component 24 can also leverage the capabilities of external analysis systems which may be commercially available to address particular risk, trend, outage, use scenarios, or other determining events. For example, in connection with the example discussed herein for the securities industry, an external analysis system could include a third party risk system for a particular class of securities or group of clients, or other class. These parameters or rules and external analysis systems can be managed via a hierarchy to set overall criteria for a group of users, specialized criteria for individual users at any level within a defined hierarchy, or other criteria. These parameters or rules and external analysis systems can be used to adjust one or more composite ratings that will be used in other processing, or may simply accumulate a value or values for the impacted users and the hierarchy within which they exist.

Figure 2:
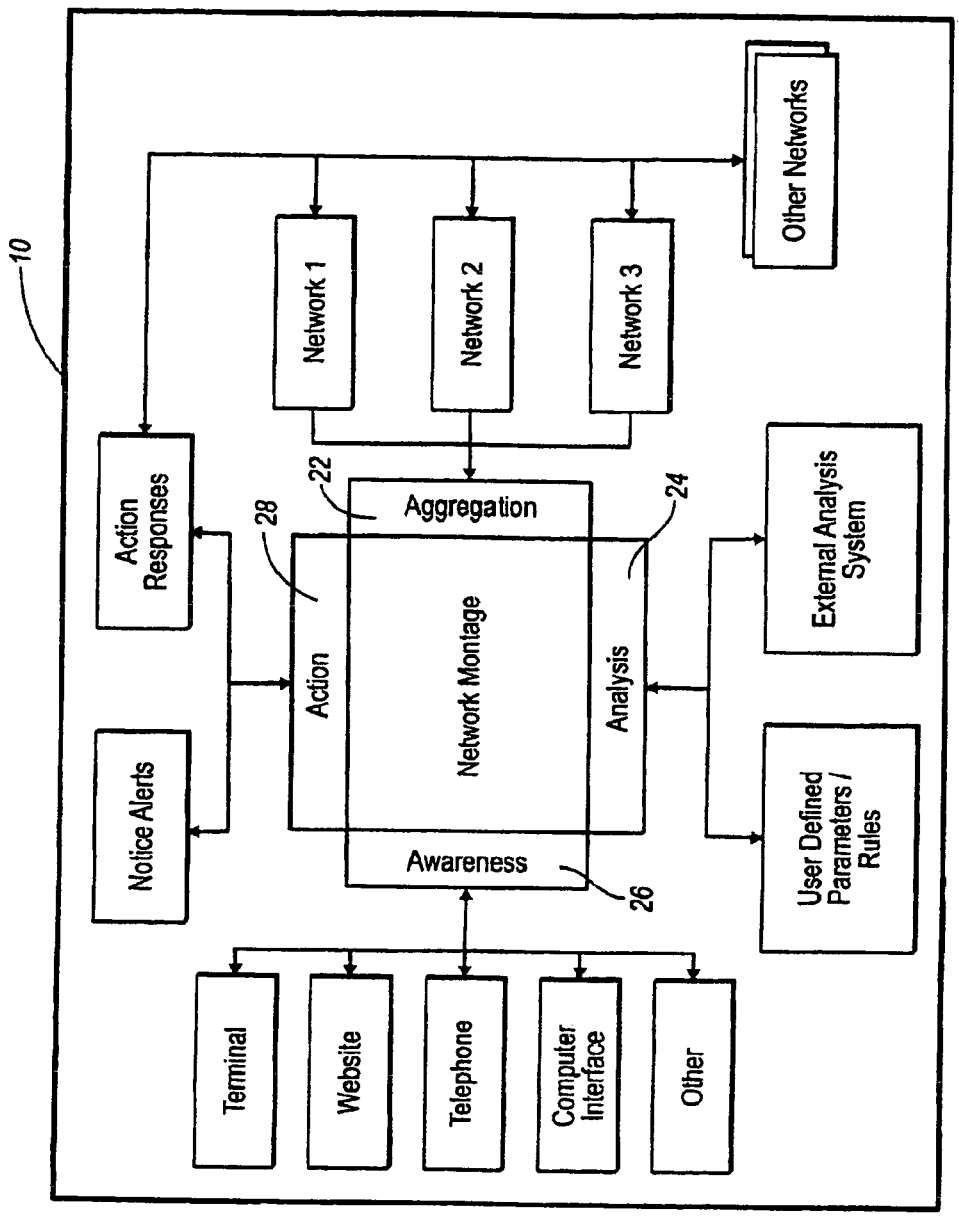
FIG. 2 is a flow diagram of interrelating components of a system in accordance with a non-limiting example embodiment.

FIG. 2 shows an awareness computer-based component 26 to provide alerts to the users. The computer 20 can limit users in viewing, and alerting users with regard to, information with respect to transactions that such users are directly involved in or with respect to which they have been granted rights by those directly involved in such transactions. In addition, the detailed level of the normalized information collected and stored in the data base 40 enables clients to perform data mining analysis with regard to such information on a historical basis.

For example, the awareness component 26 provides an interface to the system 10 by way of a dedicated computer terminal, password protected Web site, voice-prompted telephone interface, computer interface or other known methods of interaction between systems. The awareness component 26 enables users to define, identify and/or be made aware of situations, such as transactions that are relevant to the user. The system 10 allows users to define parameters, such as rules, that specify what, if any, action is warranted in response to different scenarios.

Once the analysis component 24 determines that information warrants a responsive action, for example, the information equals, exceeds or falls below parameters or rules identified by a user, a message is sent to an action component 28 which responds in accordance with user defined requests for notification alerts and/or action responses.

Notification alerts can be sent via e-mail, facsimile transmission, text message, voice, third-party message format/protocol or other messaging means to notify one or more user designated recipients, i.e., a human and/or machine, of a particular event. Notification alerts can require confirmation from recipients, if confirmation is not received within a defined timeframe. Also, follow-up notification alerts can be sent in accordance with user defined alert hierarchies until an acknowledgement is received from a designated recipient or recipients. Notification Alerts can be assigned priority to determine if they should be sent out instantaneously or after a specified amount of time, such as once an hour, a business driven window, such as once a day, or accumulate a certain number of messages before being released, or according to some other user criteria.

The action component 28 can also be programmed to create action responses in an attempt to mitigate or maximize, as appropriate, the impact of identified situations, such as transactions in different scenarios. In this regard, the most effective network(s) in which to affect an action response may be a network or networks other than the one in which the initial event occurred and/or may well be a network or networks not under the management or control of the entity that initiated the original situation or transaction. For example, in connection with the example discussed herein for the securities industry, an action response could be used to create a contrary or offsetting position in the options market to minimize the risk associated with a securities account which has exceeded permissible parameters for the acquisition of equity securities. It is also possible for the action response to create a transaction on a network that is not being monitored. The network(s) in question may not allow for the sharing of its actual activity, but it may represent the best place for the action response to occur.

One example of the awareness component 26 can be a risk management system that utilizes certain capabilities of a securities trading platform to provide users with real time stand alone risk management capabilities to address their securities trading activities as well as the securities trading activities of their clients. Many securities firms currently manage their risk and their clients' risk on an end-of-day basis. This occurs when firms' securities trading systems do not incorporate an adequate real-time risk management system or when their clients use their own securities trading systems to execute trades and report trade executions at the end of the day. This approach means that for these firms their intraday exposure to trades could exceed risk profiles established by contractual, statutory and/or regulatory guidelines. These risks could result in (i) the inability of the firms to meet capital adequacy requirements, (ii) the firms having to take contractual actions to protect themselves that could be detrimental to their clients or (iii) the firms having to take client exposures onto their own books to address the risk.

For example, if one of a clearing firm's correspondent clients were to execute a series of large short trades (exceeding their buying power) in a hard to borrow security (possibly not knowing it had been added to the clearing firm's hard to borrow list) and that security's price subsequently rose significantly during the day on some unexpected good news reports, the clearing firm would be exposed not only to significant losses from the transactions themselves but also to regulatory action for inadequate risk management procedures. With a risk management system in accordance with the technology described in this application, the clearing firm would be notified immediately as the trades were executed and could manage their clients' trading activities appropriately. The risk management system allows users to manage credit, market and operational risk for themselves and for their clients. The operational efficiencies that the risk management system delivers to users and enables the users to take on a much larger client base while reducing their overall risk resulting in increased revenues and greater return on investment.

The risk management system is also designed to monitor and manage risk in several categories. These categories include buying power/threshold restrictions, restricted and hard to borrow securities risk management, short sell restriction risk management, single order quantity limit management, single order value risk management, realized and unrealized profit and loss. The risk management system can be loaded with clients' overnight buying power and stock positions. During the day, the computer system will receive copies of all client execution messages in real-time either directly from liquidity destinations or from manual entries by authorized users with regard to transactions that may not be received electronically during the trading day. As it receives these messages it will perform risk calculations and generate appropriate alerts on a trading supervisor terminal. The risk management system can implement the full client hierarchies supported by the computer system and, optionally, can generate all necessary end of day trade reporting files for integration into the clearing firm or the client's back office systems.

During the setup of the computer system, an account hierarchy with risk parameters is created in the risk management system based on how the client wants to model and manage risk. This is done using a terminal that is connected via the Internet. At the start of each trading day, overnight buying power and stock positions may be fed into the risk management system using an automated start of day process or entered manually. During the trading day, each liquidity provider sends a copy of each execution message (i.e., a "drop copy") to the risk management system 10. These execution messages are processed by a risk management engine. Any trade that causes a risk management event will generate an alert to a trading supervisor and any other users defined in the system as authorized to receive such notifications and will also be written to a risk management log. The trading supervisor and other authorized users can then deal with the risk event in the most appropriate manner. At the end of each trading day, the risk management system can produce aggregated trade files for the users, if desired. In many situations, this will help to further optimize operations and will represent a value add service that the users can sell to their clients.

A non-limiting example is now described. A Hedge Fund buys or sells various securities asset classes such as equities and equity derivatives (e.g., futures and options) in various markets such as Exchanges, Electronic Communication Networks (ECNs) and Alternative Trading Systems (ATSs). A broker is an authorized member of the market that places and helps the Hedge Fund access the various market places.

In the example, the Hedge Fund sends an order to the broker. The broker in turn sends it to the Exchange. The order is executed at the Exchange and the execution is sent to the broker. The broker sends the execution back to Hedge Fund. Since the transaction is flowing through the broker's system, the broker knows about the transaction and is in a position to perform real time pre-trade and post-trade risk analysis on the transaction.

In another example, the Hedge Fund sends an order directly to the Exchange using the broker's name. The order is executed at the Exchange and the execution is sent to the Hedge Fund. The broker doesn't know about the execution because the Hedge Fund is not using the broker's infrastructure to send orders to the Exchange. But as far as the Exchange is concerned, it is the broker who has done the transaction and therefore the broker is liable for the trade.

The broker has to monitor the Hedge Fund's activities to comply with business and regulatory trading rules. The broker requests a copy of the execution from the Exchange. Every time an order from the Hedge Fund is executed at the Exchange, the execution is sent back to the Hedge Fund and a copy of the execution is sent to the broker.

In reality the Hedge Fund could use many standalone electronic trading systems to affect trades. In another example, the Hedge Fund is using a proprietary system to trade on an Electronic Communication Network (ECN) as well as an Alternative Trading System (ATS) and is using broker's system to trade on the Exchange. The Hedge Fund and broker need to know about all the trading activities on a real time basis in order to more effectively manage their risk.

Once a trade is done, the trade has to settle—this means that exchange of money and stock has to take place. The Exchange reports the trade to the Clearing Corporation, and the Correspondent Broker, because it is not licensed to do clearing, reports the trade to its Clearing Broker.

The Clearing Corporation processes the execution and sends the details to the Clearing Broker the next day. It is the Clearing Broker's responsibility to confirm the trades with the Correspondent Broker. Once the trade is confirmed, the Clearing Broker exchanges stock and money with the Clearing Corporation. The Clearing Broker then transfers the stock and money to Correspondent Broker's account.

The Clearing Broker is an authorized member of the Clearing Corporation and has to abide by the rules laid down by the Clearing Corporation. The Clearing Corporation takes a deposit from the Clearing Broker. The Clearing Corporation then establishes the trading profile for the Clearing Broker based on contractual, statutory and/or regulatory guidelines. The Clearing Broker could decline to clear a trade if the Correspondent Broker violates any of the trading rules. The Clearing Broker faces a risk in case the Correspondent Broker defaults.

The Correspondent Broker may report some trades on real time basis and some at end of day to the Clearing Broker. In another example, the Clearing Broker requests a drop copy of trade from the Exchange to monitor the Correspondent Broker's trading activity.

Typically, a Clearing Broker clears for Correspondent Broker. Potential problems can arise in the following scenario. Hedge Fund 1 and Hedge Fund 2 are Correspondent Broker's customers. Hedge Fund 1 directly accesses the market through its own proprietary system. Hedge Fund 2 uses Correspondent Broker's securities trading platform as well as its own proprietary system.

The Hedge Fund needs to monitor its traders' activities. Since traders are using multiple disparate systems, the Hedge Fund doesn't have a real-time centralized view. Although no one trader may be violating the trading parameters or rules, the combined activities of all the traders could lead to a violation of the trading parameters or rules. Since the market price changes dynamically, a possible close out of position could lead to monetary loss. Hence timely information of the violation is required.

Additionally, the Correspondent Broker has to comply with the rules established by the Clearing Broker. The rules relate to but are not limited to buying power, margins, hard-to-borrow symbols, short selling, and restricted securities. The Correspondent Broker has to monitor its clients trading activity. Hedge Fund 2 may short sell a hard-to-borrow security from its own proprietary system. The Clearing Broker may decline to settle the trade and the Correspondent Broker could be liable.

Further, the Clearing Broker has the responsibility to monitor the Correspondent Broker's activity. The Clearing Broker has to arrange for capital and stocks to be transferred to settle trades of the Correspondent Broker. For example, if a Hedge Fund short sells hard-to-borrow securities near the close of the market through the Hedge Fund's proprietary system and the market price rises after the close due to unexpected good news the Clearing Broker is at risk. Therefore, the Clearing Broker must set conservative limits for its Correspondent Brokers because of inadequate risk management capabilities. This limits the Clearing Broker's business volumes.

Figure 3:
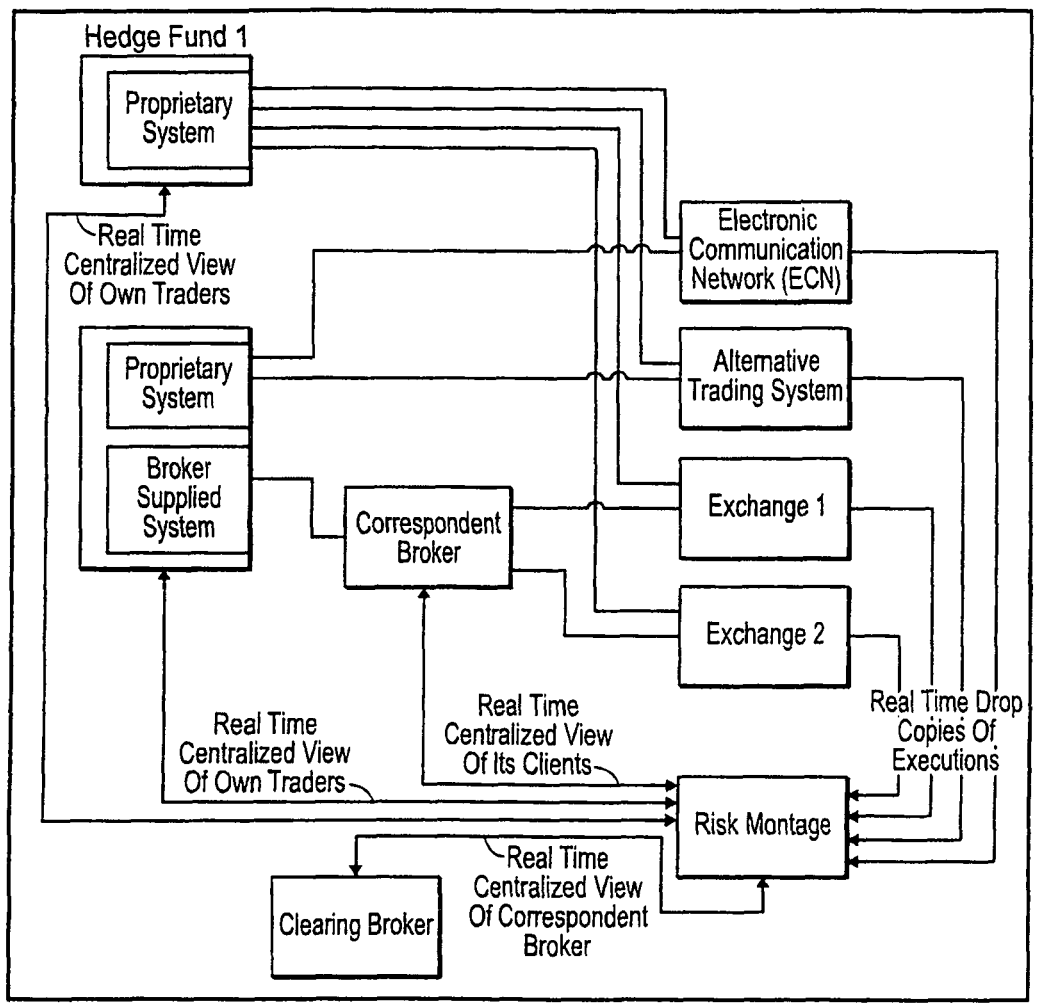
FIG. 3 is a flow diagram of an example of a system.
Figure 4:
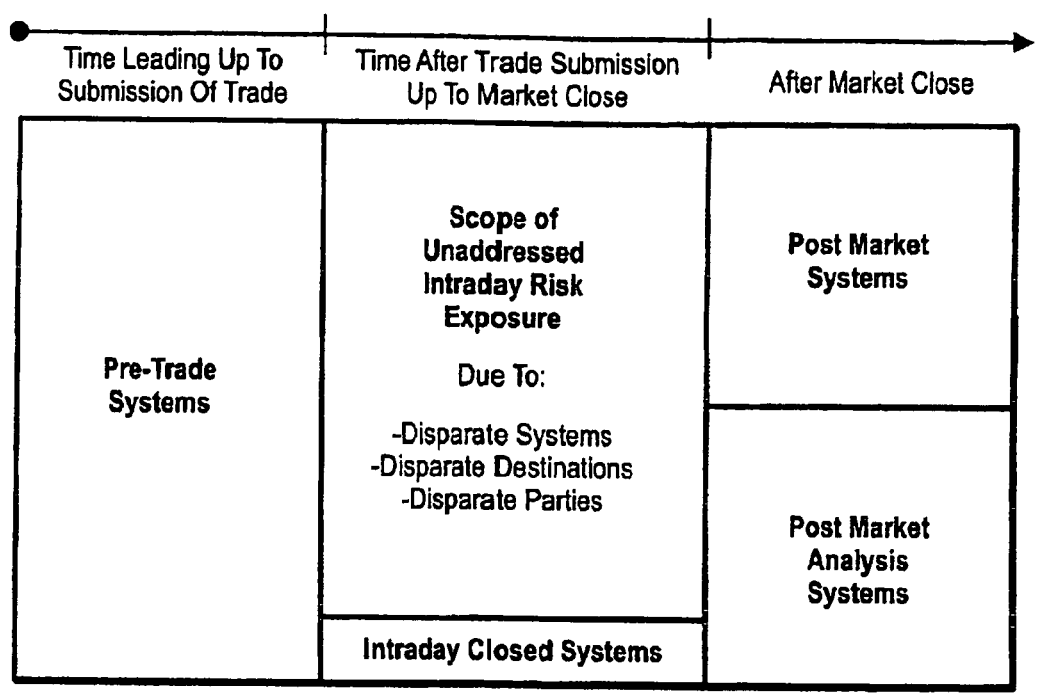
FIG. 4 is a schematic illustrating an overview of the securities trading market.

FIG. 3 illustrates an example to manage operational risk for a Clearing Broker. The system 10 connects to various destinations (ECN, ATS and Exchanges) to receive drop copies of executions on a real time basis.

The system 10 interfaces with the various liquidity destinations 30, such as market places, to collect real time electronic copies ("drop copies") of executions and notifies the users in real time of the transactions. The transactions are collected by the aggregation component 22 and then transferred to the analysis component 24 to evaluate the transactions against user criteria 60, such as a broad set of user defined rules, internal account balances and external risk management systems to determine what, if any, actions need to be taken. The action component 28 can queue a notice alert to a user or another system to make sure that the user is aware of the current state of the monitored transactions. The system 10 can also create an action response to offset the impacts of the transaction that the system 10 evaluates. The offsetting transactions can occur on the monitoring networks or on networks that are currently not being monitored by the system 10. Based on the user criteria 60, the system can require automatic execution of an offsetting transaction, or manual approval before execution.

Other non-limiting examples of potential applications are now described with respect to the U.S. financial securities market. The Clearing Broker can upload the following data into the system at the start of the day: a) cash position for each account; b) stock position for each account; c) account details; d) hard to borrow (HTB) symbols and quantity limit; e) restricted symbols; and f) buying power. The Clearing Broker can define the following risk parameters: a) buying power; b) single order quantity limit; c) single order value limit; d) whether short selling is allowed; and e) stocks in which trading is not allowed; f) quantity limit in hard to borrow stocks. The aforementioned are examples of inputs to a rules engine within the system that can be submitted electronically or manually thru a terminal connected via the Internet; other parameters could be input as well.

The system 10 can assign account hierarchy to each trade based on account parameters or rules. If the account cannot be identified, then the trade is assigned to a 'suspense' account. The user can have the ability to assign trades in suspense account to various accounts. The system 10 can update each position based on the account.

The system 10 can check for the following risk parameters and raise an alert if any of the defined parameters or rules are violated: a) short sell trade in 'hard-to-borrow' securities. (The user may assign allowable short sell quantities in hard to borrow securities for each account.); b) trade in 'restricted' securities; c) trade quantity is greater than permitted 'single order' quantity limits; d) trade value is greater than permitted 'single order' value limits; e) a short sell trade by a user restricted from short sells; f) the exposure exceeds permitted buying power limits; and g) selling stock without inventory. The system 10 can check for trading patterns that could have significant market risk, such as portfolio concentration, heavy exposure in illiquid symbols, trading in low priced security, traded volume as percentage of market volume, and trading in highly volatile securities and can also reflect real time realized and unrealized profit and loss.

The user can request notice alerts by way of computer screen popup and/or sound prompts, e-mail message, Instant Messenger, voicemail, pager or facsimile transmission.

The system could also generate an action response in the form of a contra trade to close out a position if a client violates trading parameters or rules. For example, suppose Hedge Fund 1 short sells a hard-to-borrow security at the ECN. The system 10 receives a drop copy of the transaction and checks the transaction against hard-to-borrow securities and finds that a rule has been violated. The action component 28 immediately sends a notice alert to Hedge Fund 1, Correspondent Broker and Clearing Broker. Clearing Broker sees the violation and decides to reverse the transaction (close the position). The Clearing Broker could attempt to minimize the impact of the transaction by buying in the futures market or buying call options in the options market or buying the stock in Europe.

The system 10 can be arranged to collect data from the liquidity destinations 30 as described in the various embodiments above, then the data can be output to other system(s) and network(s). This way, the system can collect the data from use with other risk management analysis programs to meet specific needs and requirements and strategies of other companies. For example, the data collected from the system 10 can be augmented with the information and capabilities of the technologies of other risk management companies.

The technology described in this application may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of monitoring financial articles of trade for risk management purposes, the method comprising:
collecting, by a transceiver, drop-copies of transaction specific data of varying formats from a plurality of liquidity destinations trading at least one financial article of trade; and
identifying, via a risk management processing system that includes at least one processor, irregular transactions within the collected drop-copies by comparing the drop-copies against a pre-defined criteria;
assigning a priority level to drop-copies identified as irregular transactions; and
issuing risk notification alerts in accordance with the assigned priority levels for the respective irregular transactions,
wherein the pre-defined criteria includes criteria for identification of at least one transaction from the collected drop-copies for which a respective party is financially liable, where the respective party that is financially liable lacked knowledge that the at least one transaction had been submitted to at least one of the plurality of liquidity destinations.

2. The method of claim 1, further comprising:
identifying relevant portions of the collected drop-copies comprising one or more transactions for which a party is financially liable and including the identified transaction;
comparing, using an analysis component of said computer, the relevant portions of the collected drop-copies against the pre-defined criteria; and
identifying a situation when said relevant portions of the collected drop-copies matches said pre-defined criteria for purposes of performing risk management for said financially liable party.

3. The method of claim 1, further comprising:
aggregating the collected drop-copies from said plurality of liquidity destinations; and
normalizing said aggregated drop-copies into a standardized form.

4. A system for processing financial articles of trade, comprising:
a transceiver that is coupled to a plurality of liquidity destinations that trade at least one of securities, commodities, options, futures, and/or derivatives, the transceiver configured to:
collect drop-copies of transaction specific data from the plurality of liquidity destinations, where the drop-copies include information on submitted and/or completed transactions of financial articles of trade and the drop-copies include data of varying formats corresponding to the associated liquidity destinations; and
a risk management processing system that includes at least one processor, the risk management processing system configured to:
perform a comparison between the collected drop-copies and a pre-defined criteria;
identify irregular transactions based on the performed comparison;
assign a priority level to drop-copies identified as including irregular transactions; and
issue risk notification alerts according to the assigned priority levels,
wherein the pre-defined criteria includes criteria for identification of whether the collected drop-copies include at least one transaction for which a respective party is financially liable as an irregular transaction, where the respective party that is financially liable lacked knowledge that the at least one transaction had been submitted to at least one of the plurality of liquidity destinations for execution thereon.

5. The system of claim 4, wherein the risk management processing system is further configured to:
identify relevant portions of the drop-copies comprising one or more transactions for which a party is financially liable and including the identified transaction;
compare the relevant portions of the drop-copies against pre-defined criteria; and
identify a situation when said relevant portions of the drop-copies matches pre-defined criteria for purposes of performing risk management for said financially liable party.

6. The system of claim 4, wherein the risk management processing system is further configured to
aggregate the drop-copies collected from said plurality of liquidity destinations;
normalize the collected and aggregated drop-copies into a standardized form; and
stream, via the transceiver, the drop-copies in the standardized form for further processing.

7. A method of monitoring intraday risk management for financial articles, the method comprising:
receiving, via a transceiver, of a plurality of transaction specific data in varying formats that are from a plurality of different liquidity destinations that trade in at least one financial article of trade, the plurality of transaction specific data including a first transaction specific data related to a first transaction performed against a first liquidity destination of the plurality of different liquidity destinations;
performing a comparison of at least the first transaction specific data against a risk management criteria;
identifying the first transaction as an irregular transaction in accordance with the performed comparison;
assigning a priority level to the identified irregular transaction; and
issuing risk notification alert in accordance with the assigned priority level for the irregular transaction,
wherein the risk management criteria includes criteria for identification of transactions with unknown financial liability based on the plurality of transaction specific data, the identified transactions with unknown financial liability including the first transaction for which a respective party is financially liable, where the respective party that is financially liable lacked knowledge that the first transaction had been performed against the first liquidity destination.

8. The method of claim 7, wherein the first transaction specific data is a drop-copy of the first transaction.

9. The method of claim 7, wherein the plurality of transaction specific data in varying formats that are from a plurality of different liquidity destinations are received in real-time in accordance with execution of the respective transaction, near real-time in accordance with execution of the respective transaction, or in accordance with a performed batch process that is to run at a predetermined time interval during intraday trading.

10. The method of claim 7, wherein the issued risk notification is issued on an intraday basis in accordance with execution of the first transaction.

11. The method of claim 7, further comprising:
calculating a cost of performing the first transaction against a second liquidity destination that is different from the first liquidity destination; and
comparing the calculated cost to an actual cost of the first transaction.

12. The method of claim 7, further comprising:
calculating an average cost of performing the first transaction against at least some of the plurality of liquidity destinations; and
comparing the calculated average cost to an actual cost of the first transaction.

13. The method of claim 7, further comprising:
generating a responsive action in accordance with the issued risk notification alert; and
in accordance with risk management, submitting the generated responsive action to a second liquidity destination that is different from the first liquidity destination.

14. The method of claim 7, further comprising:
identifying that a particular entity is financially associated with the first transaction based on the received first transaction specific data.

15. The method of claim 14, further comprising:
generating, via at least one processor, a responsive action based at least in part on the issued risk notification alert.

* * * * *